United States Patent
Chin et al.

(10) Patent No.: US 9,007,495 B1
(45) Date of Patent: Apr. 14, 2015

(54) IMAGE PROCESSING

(75) Inventors: Douglas M. Chin, Windham, MA (US); Daniel B. Grunberg, Lexington, MA (US); John K. Iler, Burlington, MA (US); Ronald Laidley, Somerville, MA (US)

(73) Assignee: Immedia Semiconductor, Inc., Andover, MA (US)

( * ) Notice: Subject to any disclaimer, the term of this patent is extended or adjusted under 35 U.S.C. 154(b) by 176 days.

(21) Appl. No.: 13/570,769

(22) Filed: Aug. 9, 2012

Related U.S. Application Data

(60) Provisional application No. 61/522,965, filed on Aug. 12, 2011.

(51) Int. Cl.
*H04N 9/64* (2006.01)
*H04N 19/186* (2014.01)

(52) U.S. Cl.
CPC .................................. *H04N 19/186* (2013.01)

(58) Field of Classification Search
CPC .............................. H04N 5/367; H04N 5/3675
USPC .................................................. 348/241, 246
See application file for complete search history.

(56) References Cited

U.S. PATENT DOCUMENTS

| | | | | |
|---|---|---|---|---|
| 6,806,902 | B1* | 10/2004 | Donovan | 348/246 |
| 8,054,348 | B2* | 11/2011 | Mori | 348/246 |
| 2002/0122123 | A1* | 9/2002 | Kimura | 348/246 |
| 2009/0174801 | A1* | 7/2009 | Dungan | 348/308 |
| 2011/0102649 | A1* | 5/2011 | Hashizume | 348/246 |
| 2011/0194764 | A1* | 8/2011 | Park et al. | 382/167 |
| 2011/0234842 | A1* | 9/2011 | Ishiga | 348/223.1 |

* cited by examiner

*Primary Examiner* — Timothy J Henn
(74) *Attorney, Agent, or Firm* — Chapin IP Law, LLC

(57) ABSTRACT

One example configuration as discussed herein includes a multi-stage image processing system. A first stage image processor in the multi-stage image processing system analyzes a first window of settings produced by an array of sensor elements in an image sensor. The first stage image processor scales one or more color ranges to detect defective sensor elements and produces corrective values on an as-needed basis. A second stage image-processing resource processes a second window of settings including original settings and/or substitute settings as produced by the first stage image processor. The second stage image processor applies a debayering algorithm to the second window of values to produce final display settings for the sensor elements.

27 Claims, 13 Drawing Sheets

|  | COL. 1 | COL. 2 | COL. 3 | COL. 4 | COL. 5 |
|---|---|---|---|---|---|
| ROW 1 | c (GREEN) | A (RED) | c (GREEN) | A (RED) | c (GREEN) |
| ROW 2 | B (BLUE) | C (GREEN) | B (BLUE) | C (GREEN) | B (BLUE) |
| ROW 3 | c (GREEN) | A (RED) | X (GREEN) | A (RED) | c (GREEN) |
| ROW 4 | B (BLUE) | C (GREEN) | B (BLUE) | C (GREEN) | B (BLUE) |
| ROW 5 | c (GREEN) | A (RED) | c (GREEN) | A (RED) | c (GREEN) |

PATTERN 220

X = ELEMENT UNDER TEST

FIG. 2

|  | COL. 1 | COL. 2 | COL. 3 | COL. 4 | COL. 5 |
|---|---|---|---|---|---|
| ROW 1 | c (BLUE) | (GREEN) | C (BLUE) | (GREEN) | c (BLUE) |
| ROW 2 | (GREEN) | B (RED) | A (GREEN) | B (RED) | (GREEN) |
| ROW 3 | C (BLUE) | A (GREEN) | X (BLUE) | A (GREEN) | C (BLUE) |
| ROW 4 | (GREEN) | B (RED) | A (GREEN) | B (RED) | (GREEN) |
| ROW 5 | c (BLUE) | (GREEN) | C (BLUE) | (GREEN) | c (BLUE) |

PATTERN 320

X = ELEMENT UNDER TEST

FIG. 3

|  | COL. 1 | COL. 2 | COL. 3 | COL. 4 | COL. 5 |
|---|---|---|---|---|---|
| ROW 1 | g (GREEN) | V (BLUE) | g (GREEN) | V (BLUE) | g (GREEN) |
| ROW 2 | H (RED) | G (GREEN) | H (RED) | G (GREEN) | H (RED) |
| ROW 3 | g (GREEN) | V (BLUE) | X (GREEN) | V (BLUE) | g (GREEN) |
| ROW 4 | H (RED) | G (GREEN) | H (RED) | G (GREEN) | H (RED) |
| ROW 5 | g (GREEN) | V (BLUE) | g (GREEN) | V (BLUE) | g (GREEN) |

PATTERN 420

X = ELEMENT UNDER TEST

IMAGE PROCESSING

RELATED APPLICATIONS

This application is related to and claims the benefit of earlier filed U.S. Provisional Patent Application Ser. No. 61/522,965 entitled "DEFECTIVE PIXEL CORRECTION," filed on Aug. 12, 2011, the entire teachings of which are incorporated herein by this reference.

BACKGROUND

In accordance with conventional image capturing, a device such as a camera can include an image sensor. Each of the multiple sensor elements in the image sensor detects a portion of light associated with an image being captured. Depending on an amount of detected light, a respective sensor element in the image sensor produces an output value indicative of the detected intensity of optical energy. Collectively, output values from each of the individual sensor elements in the array define attributes of an image captured by the camera. Based on output values from the sensor elements in the image sensor, it is possible to store, reconstruct, and display a rendition of a captured image.

It is not uncommon that an image sensor includes one or more defective sensor elements that do not produce accurate output values. This is especially true for lower cost image sensors. If a sensor element is defective, the respective output values of the defective sensor element can be excluded from a final version of an image to preserve the image's accuracy.

In some cases, sensor elements in an image sensor may not completely fail. For example, a defective sensor element may be able to partially detect optical energy and produce an output value that varies depending on detected optical intensity. However, the output values produced by the image sensor may be very inaccurate and therefore unusable in a final version of an image.

One way to manage defective sensor elements is to treat the defective sensor elements as being dead and replacing an output value of the defective sensor element with a value derived from one or more outputs of nearby sensor elements. If the algorithm to detect a bad sensor element is done incorrectly, for example, by generating replacement values when the sensor elements are actually not defective, results in degrading the quality of a respective image.

In general, methods for handling defective sensor elements can be divided into two categories: static and dynamic. Static methods can include use of a table to keep track of the defective sensor elements in an image sensor. Dynamic methods on the other hand attempt to determine defective sensor elements by looking for incongruous pixel data in each picture.

It may be desirable to use both methods (dynamic and static) at the same time, and possibly even use the dynamic defective pixel detection, to modify the list of static defective sensor elements.

One type of image sensor includes a patterned color filter such as a Bayer filter. Bayer filters are commonly used in single-chip digital image sensors installed in digital cameras, camcorders, and scanners to capture color images. A Bayer filter pattern can include 50% green pixels, 25% red pixels, and 25% blue pixels. A Bayer filter is sometimes called RGBG, GRGB, or RGGB.

In accordance with the Bayer pattern and filtering, each sensor element in a respective image sensor includes either a red, green, or blue filter to filter incoming light that strikes a corresponding sensor element. More specifically, for a sensor element including a respective red filter, the sensor element detects an intensity of red light that passes through the respective red filter. For a sensor element including a respective blue filter, the sensor element detects an intensity of blue light that passes through the respective blue filter. For a sensor element including a respective green filter, the sensor element detects an intensity of green that passes through the respective green filter.

Via the intensity of different colors detected by the sensor elements in different regions of the image sensor, it is possible to reproduce a respective image on a display screen.

BRIEF DESCRIPTION OF EMBODIMENTS

Conventional image sensors and processing of image data can suffer from a number of deficiencies. For example, one problem with the static method of keeping track of and modifying bad sensor elements is the overhead associated with management and generation of a list indicating the defective elements. Sensor elements typically die as the image sensor ages such that the list of defective sensor elements needs to evolve over the life of the product. It may be difficult to generate an accurate list during use of the image sensor because most dead sensor elements aren't completely dead. Determining whether a sensor element is defective can be very difficult without repeated verification of the sensor elements using known test patterns. If the defective list is generated too slowly, the customer may perceive that the product is defective and return it to the original place of purchase.

One embodiment as discussed herein includes a novel way of determining whether the output value produced by a respective sensor element is defective based on an analysis of different colored sensor elements in a region of interest. This disclosure includes the discovery that a sensor element under test can monitor a first color type in an optical spectrum. The values of neighboring sensor elements that monitor a different color type can be used to determine whether the sensor element under test is defective.

More specifically, in one embodiment, an image sensor can include an array of multiple sensor elements that collectively operate to capture an image. The array of multiple sensor elements produces output values representing different intensities of colors detected in the image. To determine whether a sensor element in an image sensor is defective, an image-processing resource retrieves an intensity value produced by a sensor element under test in the array. From the same captured image, the image-processing resource further retrieves a respective intensity value for each of multiple sensor elements neighboring the sensor element under test. Each of the neighboring sensor elements in the image sensor can be fabricated to monitor a different color than a particular color that is monitored by the sensor element under test. For example, the sensor element under test can be configured to detect an intensity of a particular color of light. Sensor elements neighboring (i.e., in a vicinity of) the sensor element under test can be configured to detect a different color of light than the particular color of light.

To enhance the quality of a respective image produced by the image sensor, the image-processing resource as discussed herein selectively produces a substitute value for the sensor element under test depending on the intensity values produced by the multiple neighboring sensor elements that monitor the one or more different colors. Thus, embodiments herein can include selectively modifying an output value of a sensor element under test based at least in part on settings of the neighboring sensor elements of one or more different colors.

In accordance with further embodiments, the image-processing resource scales a range (such as based on minimum and maximum values in a region of interest) derived from intensity values for at least one different color with respect to a range of intensity values detected for the particular color. In response to detecting that the intensity value produced by the sensor element under test falls outside of the scaled range or newly enlarged range, the image-processing resource then produces a substitute value for the sensor element under test.

One or more additional embodiments as discussed herein include novel ways of enhancing image quality and reducing storage capacity requirements.

For example, an image-processing resource can be configured to access values stored in a buffer. The buffer stores data outputted by multiple sensor elements of an image sensor. In one embodiment, each of the values in the buffer represents a respective amount of optical energy detected by a corresponding sensor element in an array of multiple sensor elements. In a first moving window that traverses regions of stored values produced by respective sensor elements, the image-processing resource selectively modifies at least a portion of values produced by sensor elements residing in the first moving window. In a second window that traverses the buffer of values and trails behind the first moving window, the image-processing resource analyzes the settings of the sensor elements residing in the second moving window. The values in the second moving window can include one or more values as modified by the first moving window. The image-processing resource as discussed herein utilizes the values in the second window to produce a setting for a given sensor element in the second window. This process can be repeated to produce a final value for each of multiple sensor elements in an image sensor.

As discussed herein, this manner of detecting and modifying any defective elements via the first window and then utilizing the values in a trailing second window to produce finalized values reduces an overall need for storage capacity and provides speedy generation of a finalized display element settings.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium (i.e., a computer readable hardware storage resource or resources) such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment herein includes a computer readable storage medium and/or system having instructions stored thereon to perform image processing. The instructions, when executed by a processor of a respective computer device, cause the processor or multiple processors of the system to: receive an intensity value produced by a sensor element under test, the sensor element under test selected from an array of multiple sensor elements that collectively capture an image; receive a respective intensity value for each of multiple sensor elements neighboring the sensor element under test, each of the neighboring sensor elements fabricated to monitor a different color than a particular color monitored by the sensor element under test; and selectively produce a substitute value for the sensor element under test depending on the intensity values produced by the multiple neighboring sensor elements that monitor the different color.

Another embodiment herein includes a computer readable hardware storage medium and/or system having instructions stored thereon to perform image processing. The instructions, when executed by a processor of a respective computer device, cause the processor or multiple processors of the system to: access values stored in a buffer, each of the values representing a respective amount of optical energy detected by a corresponding sensor element in an array of multiple sensor elements; in a first moving window, selectively modify at least a portion of values produced by sensor elements residing in the first moving window; and in a second window that traverses the array and trails behind the first moving window, analyze the settings of the sensor elements residing in the second moving window as selectively modified by the first moving window to produce a setting for a given sensor element in the second window.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in image processing. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/ or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 2-5 are example diagrams illustrating patterns for detecting one or more defective elements under test according to embodiments herein.

FIG. 9-10 are example diagrams illustrating patterns for detecting one or more defective elements under test according to embodiments herein.

DETAILED DESCRIPTION

Figure 1:
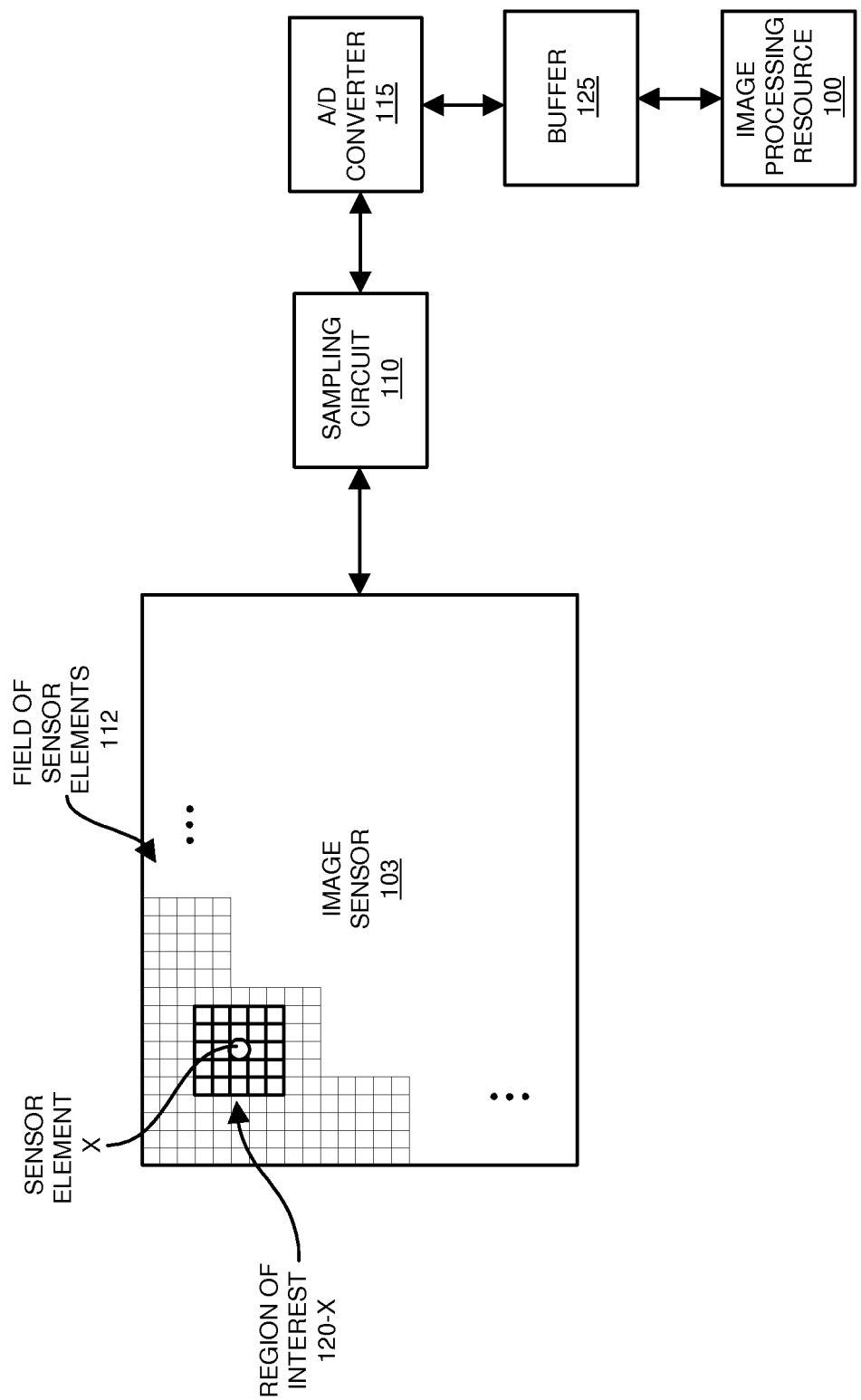
FIG. 1 is an example diagram illustrating an image sensor according to embodiments herein.

FIG. 1 is an example diagram of an image sensing and processing system according to embodiments herein.

As shown, image sensor 103 includes a field of multiple sensor elements 112. Each sensor element of image sensor 103 monitors an intensity of detected optical energy in a respective region of an image. Any of one or more suitable lenses can be used to optically direct light energy to the image sensor image sensor 103.

In one embodiment, each of the sensor elements (as depicted by smaller squares) in the image sensor 103 is configured to monitor one of multiple different possible colors of incoming light such as RED, GREEN, BLUE, WHITE, etc. By way of a non-limiting example, the image sensor 103 can include any suitable type of color filter pattern such as a Bayer filter.

In one embodiment, the sensor elements assigned to monitor a color such as RED are fabricated to monitor a first wavelength range (e.g., red wavelengths of optical energy) in an optical spectrum. The sensor elements assigned to monitor a color such as GREEN are fabricated to monitor a second wavelength range (e.g., green wavelengths of optical energy) in the optical spectrum. The sensor elements assigned to monitor a color such as BLUE are fabricated to monitor a third wavelength range (e.g., blue wavelengths of optical energy) in the optical spectrum.

In one embodiment, the first wavelength, second wavelength, and third wavelength are substantially non-overlapping such that each of the sensor elements monitors one multiple different color of interest.

In accordance with further embodiments, if desired, each of the sensor elements can be configured to one or more colors.

By way of a non-limiting example, each of the sensor elements in the image sensor 103 produces an output (e.g., a voltage, current, etc.) that varies depending on an amount of detected incoming light (i.e., optical energy) for a respective region and color monitored by the sensor element. Note that the image sensor 103 can include any number of sensor elements, a density of which may vary depending on the embodiment.

During operation, sampling circuit 110 selects a sensor element in the image sensor 103 that is to be sampled and inputted to the analog to digital circuit 115. The analog to digital circuit 115 converts the output of the selected sensor element into a digital value. The digital value produced by the analog to digital circuit 115 is stored in buffer 125.

By way of a non-limiting example, the output of the analog to digital circuit 115 can be any suitable value such as a multi-bit intensity value whose magnitude varies depending on a magnitude of detected optical energy detected by a respective sensor element. Buffer 120 stores a respective intensity value for each of the different color-filtered sensor elements in the image sensor 103.

As more particularly discussed herein, image-processing resource 100 analyzes the data stored in buffer 125 to detect occurrence of defective sensor elements in the image sensor 103. A defective sensor element is deemed to be a sensor element that appears to produce one or more improper output values over time.

In one embodiment, the image-processing resource 100 analyzes the intensity values produced by a neighboring set of different color monitoring sensor elements in a region of interest with respect to a sensor element under test to determine whether the sensor element under test is defective.

As a more specific example, assume that the sensor element X is the selected sensor element under test processed by the image-processing resource 100. To determine whether the intensity value produced by the respective sensor element X is erroneous, the image-processing resource 100 analyzes a region of interest 120-X. Region of interest can include intensity values produced by a combination of the sensor element under test X and a field of neighboring sensor elements nearby the sensor element under test X. As previously discussed, buffer 125 stores data produced by the sensor elements in image sensor 103. As discussed below, the values for the sensor elements in the region of interest 120-X are analyzed to determine whether the sensor element under test X is defective.

In accordance with one or more embodiments, the defective sensor element detection algorithm as executed by the image-processing resource 100 takes advantage of the following observations:

1. A vast majority of defective sensor elements observed to date stand-alone and are typically not located next to other defective sensor elements.

2. Intensity values produced by defective sensor elements are objectionable when they are significantly different from what they should be.

3. In an area of otherwise uniformly illuminated display elements (e.g., pixels on a display screen), rarely does a pixel have a very different value from its neighbors.

4. In highly textured areas, removing a single pixel value and replacing it with the average of its neighbors is seldom objectionable.

In one embodiment, the image-processing resource 100 individually processes a respective region of interest 120-X to determine if a respective center sensor element X is defective or not.

The image-processing resource 100 repeats the analysis in each of multiple different regions of interest in the image sensor image sensor 103 to determine whether a respective sensor element under test is defective. In this manner, the outputs of each of the sensor elements can be simultaneously analyzed to determine whether a respective sensor element is defective. In other words, the intensity values of different color filtered sensor elements can be used to determine whether a sensor element under test is defective.

As discussed below, the algorithm applied by the image-processing resource 100 can differ slightly for green and non-green pixels (e.g., blue and red) due to the different resolutions in the color filter pattern.

FIG. 2 is a diagram illustrating an example of a region of interest processed by the image-processing resource to determine whether a respective sensor element under test is defective according to embodiments herein.

As shown in this example, the image-processing resource 100 uses pattern 220 to detect whether the sensor element X (i.e., the sensor element under test in the center of pattern 220) in a region of interest is defective when the element under test X is configured to detect green filtered optical energy.

During analysis, the values A, B, C, and c in the pattern 220 or region of interest are variables set to respective intensity values produced by corresponding sensor elements in the image sensor 103 in a neighboring region with respect to sensor element under test X. As previously discussed, the values used to populate the variables are retrieved from buffer 125. As further discussed below, based on settings of the intensity values for the neighboring sensor elements and the sensor element under test, the image-processing resource 100 determines whether the sensor element under test is defective or not.

FIG. 3 is a diagram illustrating an example region of interest processed by the image-processing resource to determine whether a respective sensor element under test is defective according to embodiments herein.

As shown, the image-processing resource 100 uses pattern 320 to detect whether the sensor element X (i.e., the sensor element under test in the center of pattern 320) is defective when the element X is configured to detect blue filtered optical energy (or red filtered optical energy as the case may be). The values A, B, C, and c in the pattern 320 are variables that are set to respective intensity values produced by corresponding sensor elements in the image sensor 103 in a neighboring region with respect to sensor element under test X. As further discussed below, based on settings of the intensity values for the neighboring sensor elements and the sensor element under test, the image-processing resource 100 determines whether the sensor element under test is likely defective or not.

In one embodiment, the threshold for determining defective sensor elements is a function of the ranges of values of one or more colors in the image sensor image sensor 103. As previously discussed, in one embodiment, the image sensor 103 includes a Bayer-type filter, although the image-processing resource 100 can apply the error detection algorithm as discussed herein to any suitable pattern of color filters.

The image-processing resource 100 uses the intensity values for the different colored sensor elements to determine the range of each color. For example, as mentioned, the pixels that are the same color as "X" are marked with "C" or "c".

In one embodiment, if a magnitude of the original intensity value for the sensor element under test is deemed to be erroneous, the intensity values recorded for the "C" labeled pixels are used to determine the replacement value for defective sensor elements.

Sensor elements of one of the other colors are marked with "A" and those of the remaining color are marked with "B".

In the example pattern 220 as shown in FIG. 2, the sensor elements or locations marked with a letter "A" detect red optical energy; the sensor elements marked with a letter "B" detect blue optical energy. Note that the actual color of the pixels marked with a particular letter changes depending on where the current pixel is in the color filter pattern. This creates two possible classes of green pixels for a Bayer pattern, those that are in line with blue pixels and those in a line with red pixels, and two classes of non-green pixels, red and blue.

At the pixel level, independent of the color of "X", the inputs to the algorithm are:

The intensity value for the sensor element under test X
the minimum and maximum values of the sensor elements marked "A"
the minimum and maximum values of the sensor elements marked "B"
the minimum and maximum values of the sensor elements marked "C" or "c"
the sum and number of pixels marked "C"

It is also possible that some of the pixels normally used by the error detection and correction algorithm executed by the image-processing resource 100 are not available because the pixel being processed is at too close to the edge of the image. When calculating the inputs listed above for the sensor element under test X, any unavailable intensity values are simply ignored. The algorithm takes into account the lack of values and makes a decision based on the available values.

In one embodiment, the image-processing resource 100 implements an algorithm that basically uses a fraction of the maximum of the scaled ranges of the different colors to calculate a range of values that the current sensor element under test, X, can be and still be considered not defective. Pixels with intensity values outside this range are considered defective or dead and, in one embodiment, are replaced by the average of the values of the pixels (i.e., sensor elements) marked "C".

By way of a non-limiting example, in one embodiment, the range generated for a respective color is the difference between the maximum and the minimum values of the letter-marked pixels of that color. In one embodiment, the maximum range for determining whether the sensor element under test is defective or not is based on scaling the range of the colors that are not the same color as the sensor element under test to be comparable to that of the current pixel's (i.e., the sensor element X's) color. In other words, if the sensor element under test X is a green element, the ranges of different colored intensity values (e.g., non-green sensor elements such as blue and or red sensor elements) can serve as a basis to determine whether the sensor element under test is defective.

In a case where the intensity value for the sensor element under test falls outside a range for nearby elements of the same color (i.e., green), a large variation in intensity values for nearby sensor elements of a different color can indicate that the intensity value generated for the sensor element under test is still acceptable. Further, it is desirable not to produce a substitute value for a respective sensor element under test if the originally produced value by the sensor element under test is likely to be accurate. As mentioned, erroneous modification to healthy sensor elements will degrade image quality.

The following example C code expresses the algorithm executed by the image-processing resource 100:

```
// Per pixel algorithm inputs
int currentPixel; // value of pixel "X"
int capCTotal; // sum of available "C" pixels
int capCCount; // number of "C" pixels available;
int maxC; // maximum value of the "C" and "c" pixels;
int minC; // minimum value of the "C" and "c" pixels;
int maxA; // maximum value of the "A" pixels;
int minA; // minimum value of the "A" pixels;
int maxB; // maximum value of the "B" pixels;
int minB; // minimum value of the "B" pixels;
// parameters that adjust algorithm sensitivity
int overshootNumeratorParam; // sensitivity adjustment numerator
int overshootDenominatorParam; // sensitivity adjustment denominator (8)
int minRangeParam; // minimum range sensitivity parameter
// local variables
int cAverage; // average value of the available "C" pixels
int aScaledRange; // difference in the "A" pixels scaled to c's range
int bScaledRange; // difference in the "B" pixels scaled to c's range
int cRange; // difference in the "C" and "c" pixels
int maxRange; // max of all color ranges scaled to c's range
int overshoot; // maxRange adjusted by sensitivity parameters
int allowedMax; // largest value the pixel can have and still be good
int allowedMin; // smallest value the pixel can have and still be good
// calculate the value that will replace dead pixels
// note that this is used in scaling calculations also
cAverage=(capCTotal+capCCount/2)/capCCount; // average with rounding
// scale the ranges of the different colors to the range of the current pixel
aScaledRange=ScaleRanges(maxA, minA, cAverage); // See below
bScaledRange=ScaleRanges(maxB, minB, cAverage);
cRange=maxC−minC;
maxRange=max(minRangeParam, max(aScaledRange, max(bScaledRange, cRange);
overshoot=maxRange*overshootNumeratorParam/overshootDenominatorParam;
allowedMax=min(1023, overshoot+contextGMin);
allowedMin=max(0, contextGMax−overshoot);
if (currentPixel>allowedMax||currentPixel<allowedMin)
{
    // the pixel is "dead" so replace it
    currentPixel=cAverage;
}
```

In accordance with one embodiment, in the above code, the intent of the ScaleRanges function is to scale the range of a different color to the range of the color of the current sensor element under test. One implementation would be:

```
int ScaleRanges(int otherMax, int otherMin, int refAverage) {
    int otherAverage=(otherMax+otherMin+1)/2;
    return ((otherMax−otherMin)*refAverage)/otherAverage;
}
```

However, since division may be difficult to implement in hardware, the simpler implementation below has been used.

```
int divideLookup[16]={0, 1024/1, 1024/2, 1024/3, 1024/4, 1024/5, 1024/6, 1024/7, 1024/8, 1024/9, 1024/10, 1024/11, 1024/12, 1024/13, 1024/14, 1024/15};
// note that entry 0 is never used
int ScaleRanges(int otherMax, int otherMin, int refAverage) {
    int otherAverage=((otherMin+otherMax+1)>>1);
    // scale the averages up to a full 10 bits
    for (int zeroBits=0; zeroBits<10; zeroBits++) {
        if (otherAverage & 0x20||refAverage & 0x20) {
            break;
        }
        otherAverage<<=1;
        refAverage<<=1;
    }
    // take the 4 ms bits of the scaled up values
    otherAverage>>=6;
    refAverage>>=6;
    if (!otherAverage) {
        return 0;
    }
    else {
        return ((otherMax−otherMin)*refAverage*divideLookup[otherAverage])>>10;
    }
}
```

Another simplification can be made by constraining the parameter overshootDenominator to be a power of two so the division in the algorithm can be reduced to a right shift.

It should also be noted that windowing operations and different sensors can move the phase of the Bayer pattern so programmability in the implementation must be provided that allows the pixels to be processed with the correct color algorithm.

In one embodiment, the minRangeParam parameter prevents noise in very uniform areas from causing large numbers of defective sensor elements. The optimal value for this parameter is a function of the average intensity of the image. This can be estimated beforehand from information gathered in other parts of the image-processing pipeline while processing previous frames.

Referring again to FIG. 2, assume in this example that the sensor element under test in the image sensor 103 is a green filtered sensor element. Based on detecting that the sensor element under test is a green colored filter, the image-processing resource 100 selects pattern 220 (as opposed to pattern 320) to perform an analysis of whether the intensity value produced by the sensor element under test X needs adjustment.

Assume that a magnitude of the intensity value produced by the sensor element under test X (green) is the value=115.

Assume that a magnitude of intensity values for the sensor elements in regions (e.g., element at row 2, column 2; element at row 4, column 2; element at row 2, column 4; element at row 4, column 4) labeled with an upper case C (green) are 90, 95, 105, and 110. Assume that a magnitude of intensity values for the sensor elements in elements in pattern 220 labeled with a lower case c (green) are respectively 92, 93, 94, 106, 107, and 108. Image-processing resource 100 initially generates a range value for the color green based on regions labeled with a C and c.

In this case, based on minimum and maximum values, the C-range spans between 90 and 110 (e.g., C-range value=110−90=20). Since the magnitude 115 for the sensor element under test is outside of the range between 90 and 110, the sensor element under test X may be defective. As mentioned, and as discussed further below, if variations in the magnitudes of intensity values for the other colors (e.g., blue, red) are substantially large, the image-processing resource may not flag the intensity value of 115 for the sensor element under test as being erroneous.

Assume that a magnitude of intensity values for the sensor elements in regions labeled A (red) are 8, 9, 10, 10, 11, and 12. Image-processing resource 100 generates a range value for the color red based on regions in pattern 220 labeled with an A. In this case, based on minimum and maximum values of A elements, the A-range is calculated as being between 8 and 12 (e.g., range value=12−8=4). A-average=10 (e.g., an average of the different values labeled A is a value of 10).

In one embodiment, the image-processing resource 100 scales the range A-range (as produced for elements labeled A) to the C-range. In one embodiment, scaling the A-range to the C-range includes first normalizing the A-range to A-average. For example, (A-range value/A-average)=4/10=0.4. The scaled range includes multiplying (A-range value/A-average) *(C-average)=(0.4)*100=40. aScaled range with respect to C-average substantially equals the scaled range between 80 and 120. Scaling of the A-range (red elements) to the C-range (green elements) expands the range of acceptable values from an original range of 90 to 110 for testing the selected green sensor element under test X to a new threshold range of 80 to 120 for testing the green sensor element under test X.

Assume further in this example that a magnitude of intensity values for the sensor elements in regions labeled B (blue) are 490, 495, 500, 500, 505, and 510. Image-processing resource 100 generates a range value for the color blue based on regions labeled with a B. In this case, based on minimum and maximum values for elements labeled B, the B-range is between 490 and 510 (e.g., B-range value=510−490=20).

Image-processing resource 100 generates a range value for the color blue based on regions labeled with a B. In this case, based on minimum and maximum values, the B-range is between 490 and 510 (e.g., B-range value=510−490=20). B-average=500 (e.g., average of elements labeled B). The image-processing resource 100 scales the range B-range to the C-range. In one embodiment, scaling the B-range to the C-range includes normalizing the B-range to the B-average. For example, B-range value/B-average=20/500. The scaled range includes multiplying (B-range value/B-average)*(C-average)=(0.04)*100=4. bScaled range with respect to C-average substantially equals the range 98 to 102. This scaled B-range does not enlarge the C-range. Thus, the bScaled range is not used to modify the already enlarged C-range 80 to 120.

Thus, summarizing the above example processes of scaling range sequence of frames different colors, the image-processing resource 100 produces a first average value (e.g., C-average=100), the first average value is derived from the C values produced by the neighboring sensor elements that monitor the color green; the image-processing resource 100 produces a second average value (e.g., A-average=10), the second average value is derived from the values produced by the neighboring sensor elements that monitor the different color (e.g., RED color); the image-processing resource 100 produces a gain value (e.g., ratio value), the gain value substantially equal to the second average value (e.g., 100) divided by the first average value (e.g., 100/10); the image-processing resource 100 effectively multiplies the second range (e.g., 4) by the gain value 10 to produce a new range 40; in response to detecting that the newly scaled range 40 is larger than a width of the first range (i.e., C-range value=110−90=20), the image-processing resource 100 scales the new scaled range value (40) with respect to the first average value (100) to produce the threshold range. In one embodiment, the image-processing resource 100 centers the new range (40) about C-average to produce a threshold range between 80 and 120 for testing the sensor element under test.

In this example embodiment, the image-processing resource 100 compares the value (i.e., 115) of the sensor element under test X to the newly enlarged range 80 to 120. Although the intensity value of 115 falls outside the original C-range between 90 and 110, the intensity value of 115 is not considered to be an error (i.e., the sensor element is not considered to be defective) in this instance since there is a significant variance or gradient in intensity values with respect to the other color element (i.e., Red color filtered pixels) in a vicinity of the sensor element under test. The variation in values produced by the red colored sensor elements effectively causes the acceptable range for the green element under test to be widened.

Thus, embodiments herein include: producing a first range (e.g., C-range), the first range defined by a range of values (e.g., minimum and maximum values) produced by neighboring sensor elements that monitor the particular color; producing a second range (e.g., A-range), the second range defined by a range of values (e.g., minimum and maximum values) produced by neighboring sensor elements that monitor the different color (e.g., RED); deriving a threshold range (e.g., new or enlarged range 80 to 120) based at least in part on the second range; and comparing the intensity value (e.g., 115) produced by the sensor element under test X to the derived threshold range (e.g., 80 to 120) to determine whether to produce the substitute value for the sensor element under test X.

Assume in the same example above that the intensity value for the sensor element under test is a value of 125 instead of 115 as in the previous example. In such an instance, because the value 125 for the sensor element under test X falls outside of the expanded range 80 and 120, the intensity value and/or sensor element under test X would be considered defective. Additionally, the image-processing resource 100 generates a substitute value for the sensor element under test X. More specifically, in response to detecting that the intensity value produced by the sensor element under test X is likely not representative of an actual amount of optical energy of the particular color (i.e., green in this example) inputted to the sensor element under test, the image-processing resource 100 produces the substitute value for the sensor element under test X based at least in part on intensity values produced by an additional set of neighboring sensor elements (e.g., intensity values in regions of pattern 220 that are marked with an upper case C and/or c) with respect to the sensor element under test. As previously discussed, the set of neighboring sensor elements labeled c or C are fabricated to also monitor the color green.

In this example, because the intensity value 125 for the sensor element under test falls outside the acceptable range, the image-processing resource 100 produces the substitute value for the sensor element under test X to reside within a range derived from the intensity values produced by the additional set of neighboring sensor elements. As an example, the range of values for regions labeled C is between 90 and 110. In one embodiment, the image-processing resource 100 chooses a substitute value to be a value such as 100, an average of the surrounding green filtered sensor elements.

Assume in another example above that the intensity value for the sensor element under test is a value of 100 instead of 115 as in the previous example. In such an instance because the value of 100 for the sensor element under test falls within the range 90-110 for the other green sensor elements, the sensor element under test is deemed not defective.

Figure 5:
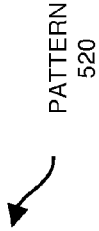

FIGS. 4 and 5 are example diagrams illustrating an alternative way of image processing according to embodiments herein.

In this example: C=current pixel component (i.e. Red, Green, or Blue)

D=non-current component 1
E=non-current component 2
H,V,R,G,B,b,g=components as per diagrams
(#) maximum # of pixels in a computation (subject to availability)
A=allowed
O=overshoot
Except where otherwise noted, divides are by powers of 2 and are implemented by adding a rounding factor then shifting
Xrange=Xmax−Xmin
Xscalerange (Refavg)=((Xmax−Xmin)*Refavg)/((Xmax+Xmin)/2)
(If desired, division can be approximated via table lookup)

Error detection Algorithm implemented by the image-processing resource 100:

if (currently on green pixel location) {
compute Gmax(12) and Gmin(12) // use G and g pixels
Crange=Gmax−Gmin
Cavg=sum(G(4))/(4) // uses G but not g pixels
compute Dmax(6) and Dmin(6) // use H pixels
compute Emax(6) and Emin(6) // use V pixels
}
else {// currently on red or green location
compute Bmax(8) and Bmin(8) // use B and b pixels
Crange=Bmax−Bmin
Cavg=sum(B(4))/(4) // uses B but not b pixels
compute Dmax(4) and Dmin(4) // use G pixels
compute Emax(4) and Emin(4) // use R pixels
}
compute Dscalerange(Cavg)
compute Escalerange(Cavg)
Mergedrange=max(Parammin, Crange, Dscalerange, Escalerange)
Orange=(Mergedrange*Paramnum)/Paramden
Amax=min(1023, Orange+Cmin)
Amin=max(0, Cmax−Orange)
If ((currentPixel<Amin)||(currentPixel>Amax)) {
currentPixel=Cavg // pixel is dead, replace with average
}

Implementation Enhancements—Reduced Buffering

In one embodiment, the described on-the-fly Defective Pixel Correction (DPC) algorithm is used just before a debayering step, where the R,G, and B pixels are converted into an RGB triplet at each pixel location. In one embodiment, it may be desired to implement the detection and correction algorithm without using additional line buffers. Assuming the image-processing resource operates on a 5×5 matrix of values as discussed herein, the buffer 125 can be a 5 line buffer to process the image into a corrected pixel version, before being fed to a respective debayering algorithm.

Figure 6:
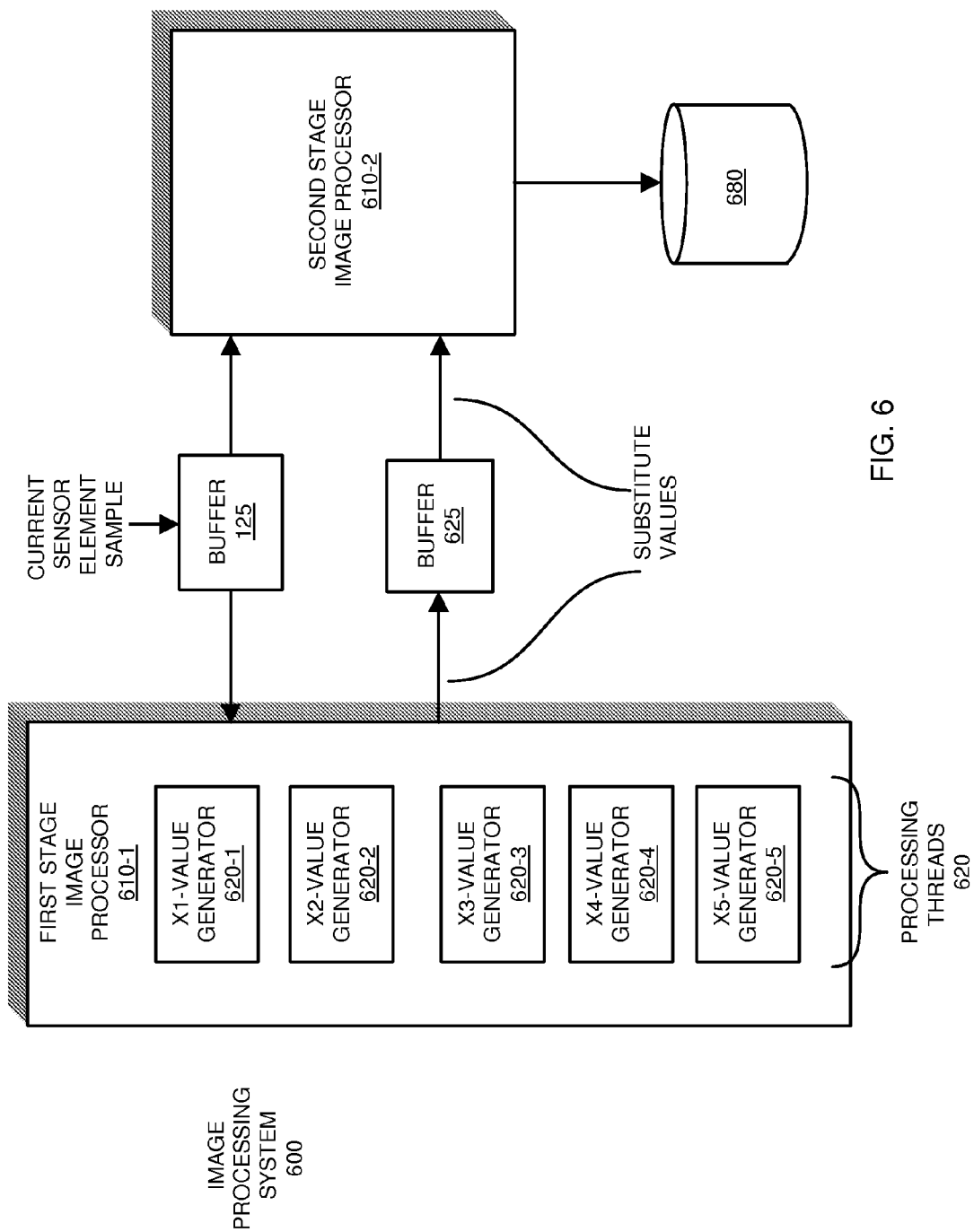
FIG. 6 is an example diagram illustrating an image-processing system according to embodiments herein.

In order to implement one embodiment without any additional line buffers, embodiments herein can include modifications. For example, FIG. 6 is an example diagram illustrating image processing system 600 according to embodiments herein.

In one embodiment, in order to eliminate the need for any additional line buffers, the DPC algorithm as executed by the image processing system 600 can be configured to analyze 5 lines around the center pixel that we are trying to debayer and produce 5 lines that can go to the debayering step. Note that the difference between this and the previous description is that the DPC algorithm for the 5 line's pixels (dpc5 or X5-value generator 620-5) cannot look at the data below that pixel, and similarly, the DPC algorithm for dpc1 or X1-value generator 620-1 cannot look at data above that pixel because the data is not stored in the buffer 125. Since the debayering step typically weights the pixels farther from the center pixel less than the center pixel, we can degrade the performance of the DPC algorithm slightly for dpc1 (i.e., X1-value generator 620-1), dpc2 (i.e., X2-value generator 620-2), dpc4 (i.e., X4-value generator 620-4), dpc5 (i.e., X5-value generator 620-5).

Thus embodiments herein include use of a structure, where the algorithm for dpc3 (i.e., X3-value generator 620-3) is any DPC algorithm that looks at some amount of data around raw3 (5 in this example, but could be a different number), and each dpc-i is any DPC algorithm that looks at raw1-5, for each i.

We describe below specific instances of the dpc1-5 algorithms (i.e., X1-value generator 620-1, X2-value generator 620-2, X3-value generator 620-3, X4-value generator 620-4, and X5-value generator 620-5 in FIG. 6).

To minimize system buffering, DPC takes place in parallel with de-Bayering. When generating a line of de-Bayered data, 5 lines of raw Bayer input data, centered around the desired output line, are processed by DPC to create 5 lines of data that are used by de-Bayering to create a single line of output. Therefore, each line in the input is processed 5 times, each time using a slightly different algorithm due to the amount and position of surrounding data that is used to make defective pixel decisions.

Figure 9:
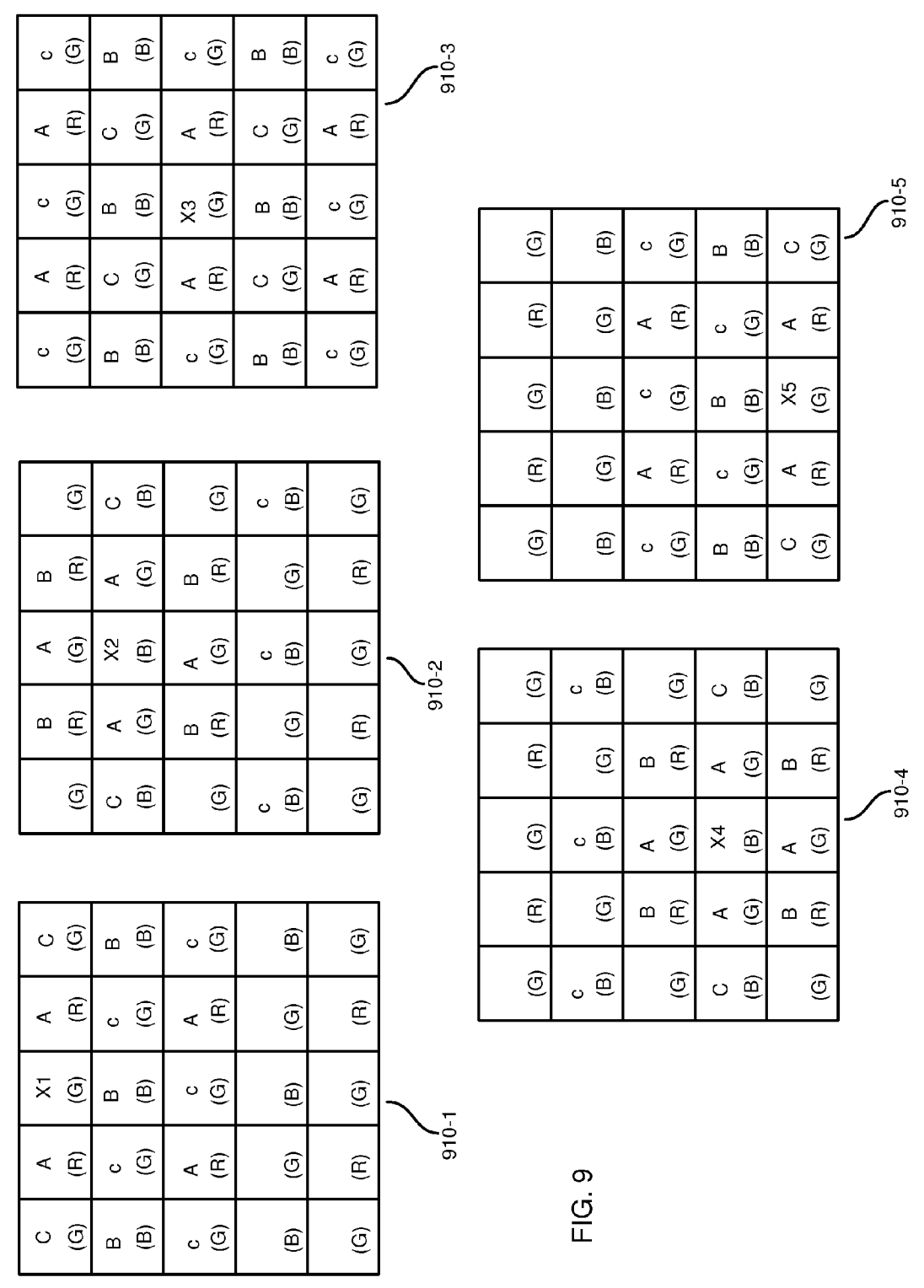
Figure 10:
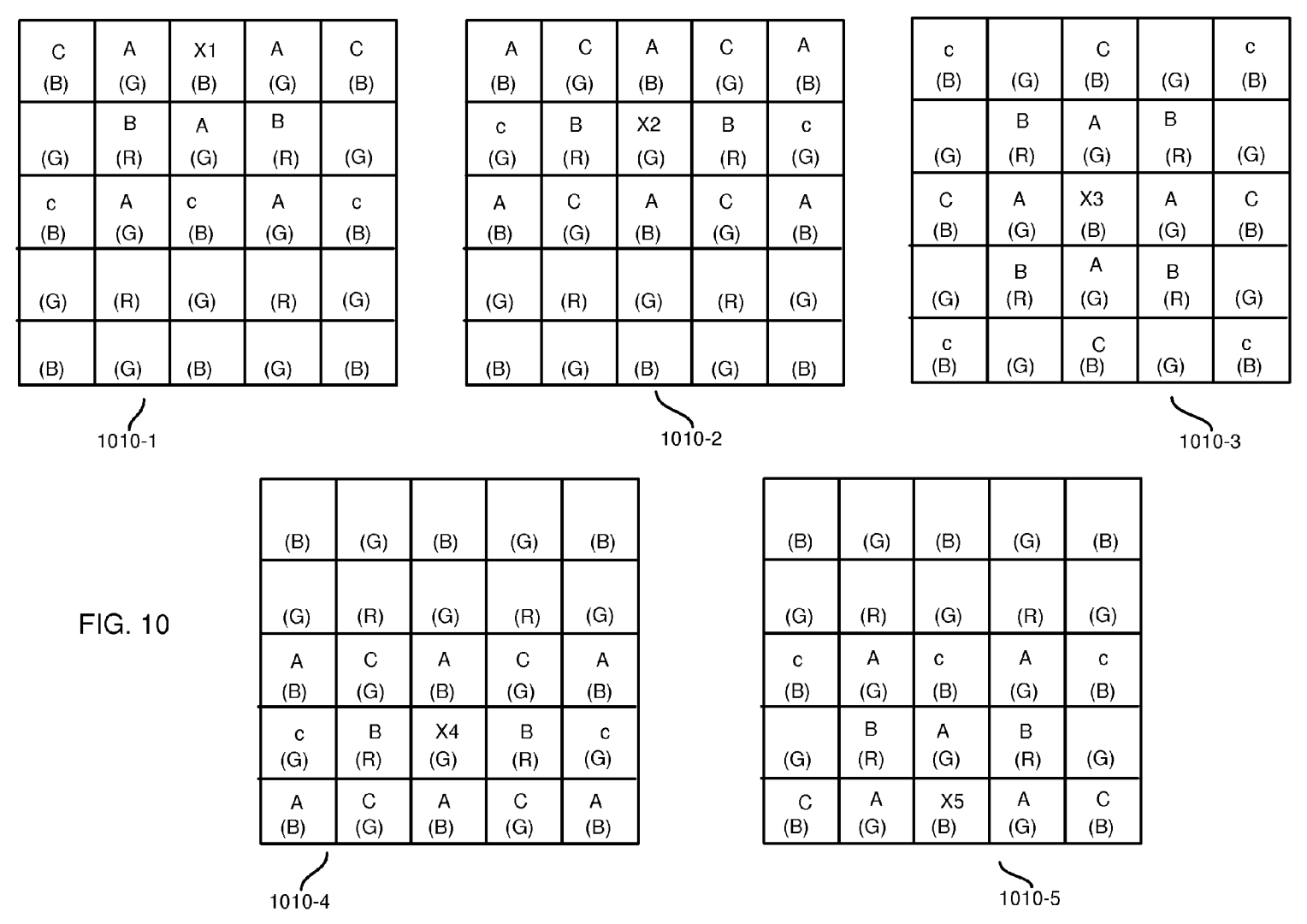

The processing threads 620 use the patterns in FIGS. 9 and 10 to detect defective sensor elements. The algorithms and patterns in FIGS. 9 and 10 also differ slightly for green and non-green pixels due to their different resolutions in the Bayer pattern.

In one embodiment, the defective pixel decision for each pixel is derived from the values of nearby pixels such that a 5×5 block of input pixels is used to generate 5 output pixels that correspond to the 5 pixel vertical line in the center of the input block. Each of the 5 blocks shown in FIG. 9, labels the pixels involved in processing the pixel marked "X" when the center pixel of the block is green. Similarly, FIG. 10, below, labels the pixels involved when the center pixel is not green.

By way of a non-limiting example, the threshold for determining defective pixels is a function of the ranges of values of all three colors in the Bayer matrix. The pixels used to determine the range of each color are identified by letters. The pixels that are the same color as "X" are marked with "C" or "c". Only the "C" pixels are used to determine the replacement value for defective pixels. Pixels of one of the other colors are marked with "A" and those of the remaining color are marked with "B". The actual color of the pixels marked with a particular letter changes depending on where the "X" pixel is in the Bayer pattern. This creates two classes of green pixels, those that are in line with blue pixels and those in a line with red pixels, and two classes of non-green pixels, red and blue.

At the pixel level, independent of the color of "X", the inputs to the algorithm are:

The value of pixel "X"

the minimum and maximum values of the pixels marked "A"

the minimum and maximum values of the pixels marked "B"

the minimum and maximum values of the pixels marked "C" or "c"

the sum and number of pixels marked "C"

It is possible that some of the pixels normally used by the algorithm are not available because the pixel being processed is too close to the edge of the image. When calculating the inputs listed above, the unavailable pixels are simply ignored with only one exception. The sum and number of pixels marked "C" is used to calculate the average value that is used to replace defective pixels. When working on a non-green center pixel, as shown in pattern 1010-3 of FIG. 10, if one of the "C" pixels is not available, it is replaced by the "C" pixel directly across from it on the other side of the pixel marked "X". This allows the average to be calculated by shifting by 2 instead of dividing by 3.

In one non-limiting example embodiment, the algorithm uses a fraction of the maximum of the scaled ranges of the different colors to calculate a range of values that the current pixel can have and still be called good (i.e., not defective). Pixels with values outside this range are considered defective and are replaced by the average of the values of the pixels marked "C". The range of a color is the difference between the maximum and the minimum values of the letter marked pixels of that color. The maximum range is computed by scaling the range of the colors that are not the same as the current pixel to be comparable to that of the current pixel's color.

Note that the pattern of pixels used to determine whether or not pixel "X" is defective for the bottom two pixels in the center vertical line is the same as that used for the top two pixels, but mirrored over the center horizontal line.

The following C code expresses the algorithm:

```
// Per pixel algorithm inputs
int currentPixel; // value of pixel "X"
int capCTotal; // sum of available "C" pixels
int capCCount; // number of "C" pixels available;
int maxC; // maximum value of the "C" and "c" pixels;
int minC; // minimum value of the "C" and "c" pixels;
int maxA; // maximum value of the "A" pixels;
int minA; // minimum value of the "A" pixels;
int maxB; // maximum value of the "B" pixels;
int minB; // minimum value of the "B" pixels;
// parameters that adjust algorithm sensitivity
int overshootNumeratorParam; // sensitivity adjustment numerator
int overshootDenominatorParam; // sensitivity adjustment denominator (8)
int minRangeParam; // minimum range sensitivity parameter
// local variables
int cAverage; // average value of the available "C" pixels
int aScaledRange; // difference in the "A" pixels scaled to c's range
int bScaledRange; // difference in the "B" pixels scaled to c's range
int cRange; // difference in the "C" and "c" pixels
int maxRange; // max of all color ranges scaled to c's range
int overshoot; // maxRange adjusted by sensitivity parameters
int allowedMax; // largest value the pixel can have and still be good
int allowedMin; // smallest value the pixel can have and still be good
// calculate the value that will replace defective pixels
// note that this is used in scaling calculations also
cAverage=(capCTotal+capCCount/2)/capCCount; // average with rounding
// scale the ranges of the different colors to the range of the current pixel
aScaledRange=ScaleRanges(maxA, minA, cAverage); // See below
bScaledRange=ScaleRanges(maxB, minB, cAverage);
cRange=maxC-minC;
maxRange=max(minRangeParam, max(aScaledRange, max(bScaledRange, cRange));
overshoot=maxRange*overshootNumeratorParam/overshootDenominatorParam;
allowedMax=min(1023, overshoot+contextGMin);
allowedMin=max(0, contextGMax-overshoot);
if (currentPixel>allowedMax||currentPixel<allowedMin)
{
    // the pixel is "defective" so replace it
    currentPixel=cAverage;
}
```

In one embodiment, in the above code, the intent of the ScaleRanges function is to scale the range one color to the range of the color of the current pixel. The simplest implementation would be:

```
int ScaleRanges(int otherMax, int otherMin, int refAverage) {
    int otherAverage=(otherMax+otherMin+1)/2;
    return ((otherMax-otherMin)*refAverage)/otherAverage;
}
```

However, since division is hard to implement in hardware, the simpler implementation below has been used.

```
int divideLookup[16]={0, 1024/1, 1024/2, 1024/3, 1024/4,
    1024/5, 1024/6, 1024/7, 1024/8, 1024/9,
    1024/10, 1024/11, 1024/12, 1024/13, 1024/14, 1024/15};
// note that entry 0 is never used
int ScaleRanges(int otherMax, int otherMin, int refAverage) {
    int otherAverage=((otherMin+otherMax+1)>>1);
    // scale the averages up to a full 10 bits
    for (int zeroBits=0; zeroBits<10; zeroBits++) {
        if (otherAverage & 0x20||refAverage & 0x20) {
            break;
        }
        otherAverage<<=1;
        refAverage<<=1;
    }
    // take the 4 ms bits of the scaled up values
    otherAverage>>=6;
    refAverage>>=6;
    if (!otherAverage) {
        return 0;
    }
    else {
        return ((otherMax-otherMin)
            *refAverage*divideLookup[otherAverage])>>10;
    }
}
```

Another simplification can be made by constraining the parameter overshootDenominator to be a power of two so the division in the algorithm can be reduced to a right shift.

It should also be noted that windowing operations and different sensors can move the phase of the Bayer pattern so programmability in the implementation is provided that allows the pixels to be processed with the correct color algorithm.

The minRange parameter prevents noise in very uniform areas from causing large numbers of defective pixels. The optimal value for this parameter is probably a function of the average intensity of the image. Presumably this can be estimated beforehand from information gathered in other parts of the image-processing pipeline while processing previous frames.

More particularly, as shown in FIG. 6, the image processing system 600 includes a first stage image processor 610-1, a second stage image processor 610-2, buffer 125, optional buffer 625 to store substitute intensity values, and repository 680.

As previously discussed, a combination of the sampling circuit 110 and analog to digital circuit 115 produce digital values (e.g., intensity values) for storage in buffer 125. The first stage image processor 610-1 includes multiple processing threads 620 (e.g., X1-value generator 620-1, X2-value generator 620-2, X3-value generator 620-3, X4-value generator 620-4, and X5-value generator 620-5).

In one embodiment, as mentioned, each of the multiple processing threads 620 determines whether a respective element under test in a column under test is defective. In a manner as previously discussed, the processing threads can selectively generate substitute intensity values 625 for failing or defective sensor elements in the image sensor 103.

Second stage image processor 610-2 has access to the original intensity values stored in buffer 125 and the generated substitute intensity values (if any) stored in buffer 625. Second stage image processor 610-2 can be a debayer process in which the R,G, and B pixels are converted into an RGB triplet at each pixel location. As mentioned, in one embodiment, it may be desired to implement the detection and correction algorithm without using additional line buffers or reducing an amount of line buffers that regarding needed in a respective integrated circuit or silicon chip in which all or part of processing system 600 resides.

Figure 7:
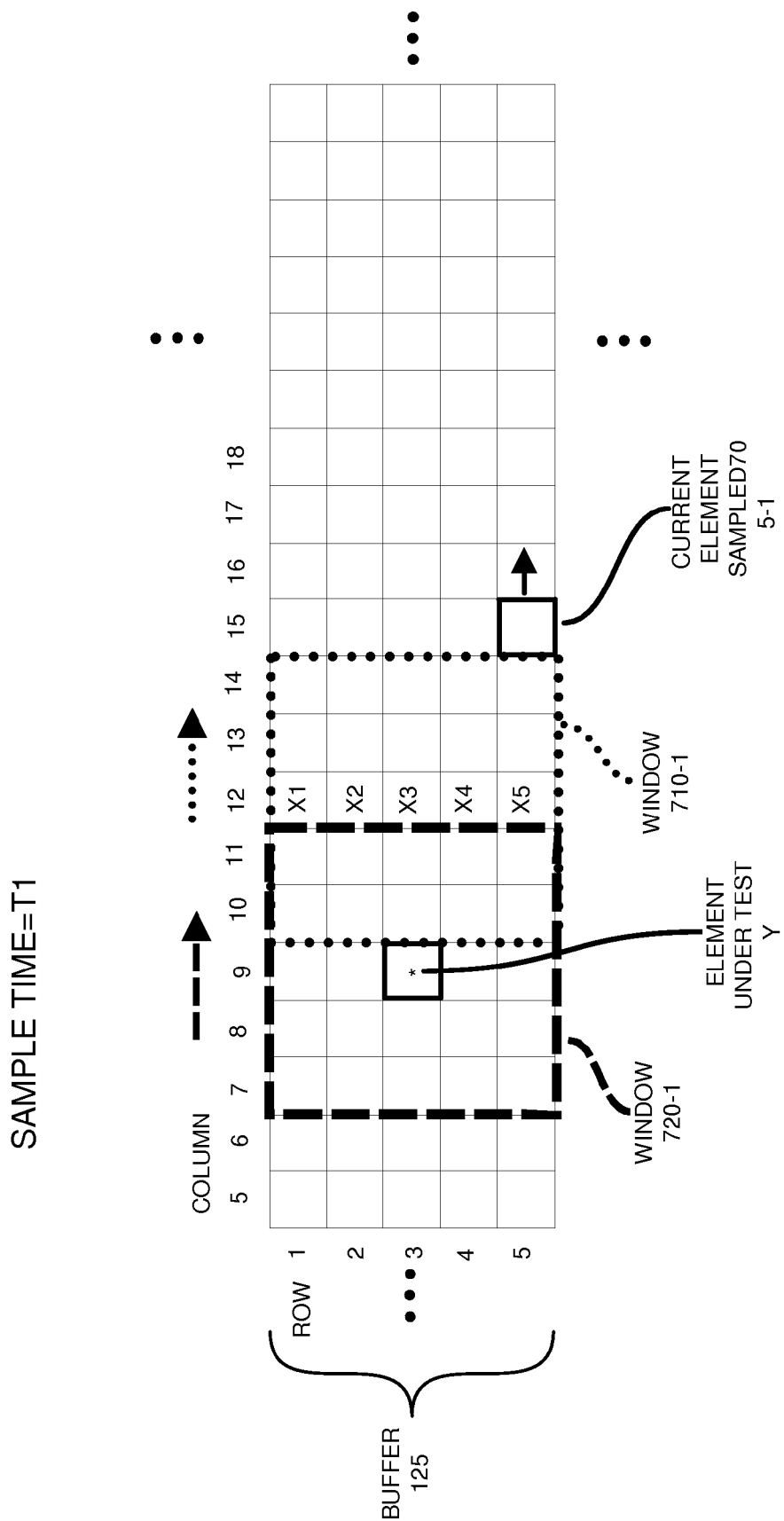
FIG. 7 is an example diagram illustrating multiple processing windows at sample window time T1 according to embodiments herein.

FIG. 7 is an example diagram illustrating multi-stage processing according to embodiments herein.

As previously discussed, for a given image frame, buffer 125 stores intensity values produced by the respective sensor elements in the image sensor 103. In one embodiment, the sampling circuit 110 scans across each of the rows of sensor elements from left to right. After completing a row, the sampling circuit 115 starts sampling the next row of sensor elements in the image sensor 103. The sampling circuit 115 repeats this raster scanning for each row. Eventually the sampling circuit 115 reaches the end of the last row in the buffer 125 and overwrites the oldest stored data in buffer 125 as it samples the new data. Thus, the buffer 125 can be a rolling buffer of data.

In one embodiment, the size of buffer 125 is limited with respect to the number of sensor elements in the image sensor 103. For example, the buffer 125 can be sized to store intensity values (e.g., each value being a multi-bit value) for multiple lines (e.g., 5 lines) of sensor elements in the image sensor 103. In one embodiment, the image sensor 103 includes many thousands of rows of sensor elements. Thus, the intensity values temporarily stored in buffer 125 (such as a line buffer) can represent sensor element or pixel settings for only a small number of sensor elements in the image sensor 103.

As shown, at sample window time t1, the sampling circuit 115 samples the sensor element of image sensor 103 at row 5 column 15 and stores the detected value in buffer 125.

Also, during sample window time t1, the first stage image processor 610-1 implements multiple processing threads 620 to analyze settings for the sensor elements in window 710-1 and selectively produce substitute values 625 if it is determined that a respective intensity value recorded for the sensor element under test is defective.

More specifically, for sample time t1, and depending on a filter color of the X1 element under test, the X1-value generator 620-1 selectively applies the pattern 910-1 (in FIG. 9) or pattern 1010-1 (in FIG. 10) to window 710-1 of settings (i.e., intensity values) to analyze an original intensity value produced for the sensor element at row 1 column 12. In a manner as previously discussed, using the error detection and correction algorithm, the X1-value generator 620-1 determines whether the intensity value stored in buffer at row 1 column 12 for element X1 needs to be corrected. If so, the X1-value generator 620-1 produces and stores a respective substitute value for the element under test X1 in buffer 625. As an alternative, the X1-value generator 620-1 can overwrite an original value in buffer 125 at row 1, column 12 with a substitute value.

For sample time t1, depending on a filter color of the X2 element under test, the X2-value generator 620-2 selectively applies the pattern 910-2 (in FIG. 9) or pattern 1010-2 (in FIG. 10) to window 710-1 of settings to analyze an original intensity value produced for the sensor element at row 2 column 12. In a manner as previously discussed, using the error detection and correction algorithm, the X2-value generator 620-2 determines whether the intensity value stored in buffer at row 2, column 12 needs to be corrected. If so, the X2-value generator 620-2 produces and stores a respective substitute value for the element under test X2 in buffer 625. As an alternative, the X2-value generator 620-2 can overwrite an original value in buffer 125 at row 2, column 12 with a substitute value.

For sample time t1, and depending on a filter color of the X3 element under test, the X3-value generator 620-3 selectively applies the pattern 910-3 (in FIG. 9) or pattern 1010-3 (in FIG. 10) to window 710-1 of settings to analyze an original intensity value produced for the sensor element at row 3 column 12. In a manner as previously discussed, and using the error detection and correction algorithm, the X3-value generator 620-3 determines whether the intensity value stored in buffer at row 3, column 12 needs to be corrected. If so, the X3-value generator 620-3 produces and stores a respective substitute value for the element under test X3 in buffer 625. As an alternative, the X1-value generator 620-1 can overwrite an original value in buffer 125 at row 3, column 12 with a substitute value.

For sample time t1, and depending on a filter color of the X4 element under test, the X4-value generator 620-4 selectively applies the pattern 910-4 (in FIG. 9) or pattern 1010-4 (in FIG. 10) to window 710-1 of settings to analyze an original intensity value produced for the sensor element at row 4 column 12. In a manner as previously discussed, and using the error detection and correction algorithm, the X4-value generator 620-4 determines whether the intensity value stored in buffer at row 4, column 12 needs to be corrected. If so, the X4-value generator 620-4 produces and stores a respective substitute value for the element under test X4 in buffer 625. As an alternative, the X1-value generator 620-1 can overwrite an original value in buffer 125 at row 4, column 12 with a substitute value.

For sample time t1, and depending on a filter color of the X5 element under test, the X5-value generator 620-5 selectively applies the pattern 910-5 (in FIG. 9) or pattern 1010-5 (in FIG. 10) to window 710-1 of settings to analyze an original intensity value produced for the sensor element at row 5 column 12. In a manner as previously discussed, and using the error detection and correction algorithm, the X5-value generator 620-5 determines whether the intensity value stored in buffer 125 at row 5, column 12 needs to be corrected. If so, the X5-value generator 620-5 produces and stores a respective substitute value for the element under test X5 in buffer 625. As an alternative, the X1-value generator 620-1 can overwrite an original value in buffer 125 at row 5, column 12 with a substitute value.

In certain instances, very few sensor elements are defective. Thus, the first stage image processor 610-1 may only occasionally generate a substitute value for overwriting or replacing an original value as detected by analog to digital circuit 115.

In one embodiment, the first stage image processor 610 simultaneously executes the processing threads 620 to generate respective substitute values on an as-needed basis. Note that in one embodiment, the window 710-1 scans to the right for each successive sample time. In this example, the window 710-1 lags just behind the current sensor element (e.g., row 15, column 5) of image sensor 103 that is being sampled by the sampling circuit 115. The amount of lag between the current sample window of the sampling circuit a 110 and the window 710-1 can vary depending on the embodiment.

Second stage image processor 610-2 processes settings (corrected or original settings) of values associated with the sensor elements in window 720-2. As previously discussed, in one embodiment, the second stage image processor 610-2 implements a debayering algorithm to produce a setting for element under test Y (e.g., row 3 column 9). Second stage image processor 610-2 has access to buffer 125 that stores the original intensity values produced by the sensor elements as well as the substitute values (if any) in buffer 625 as produced by the first stage image processor 610-1. The setting of element Y as produced by the second stage image processor 610-2 depends on magnitudes of the corrected or rigid setting in a manner as previously discussed.

The amount of lag between window 710-1 and window 720-1 can be 3 time samples as shown such that the window 720-1 analyzes corrected elements. The amount of lag between window 710-1 and window 710-2 can vary depending on the embodiment.

Second stage image processor 610-2 stores the value produced for element under test Y in repository 680.

Figure 8:
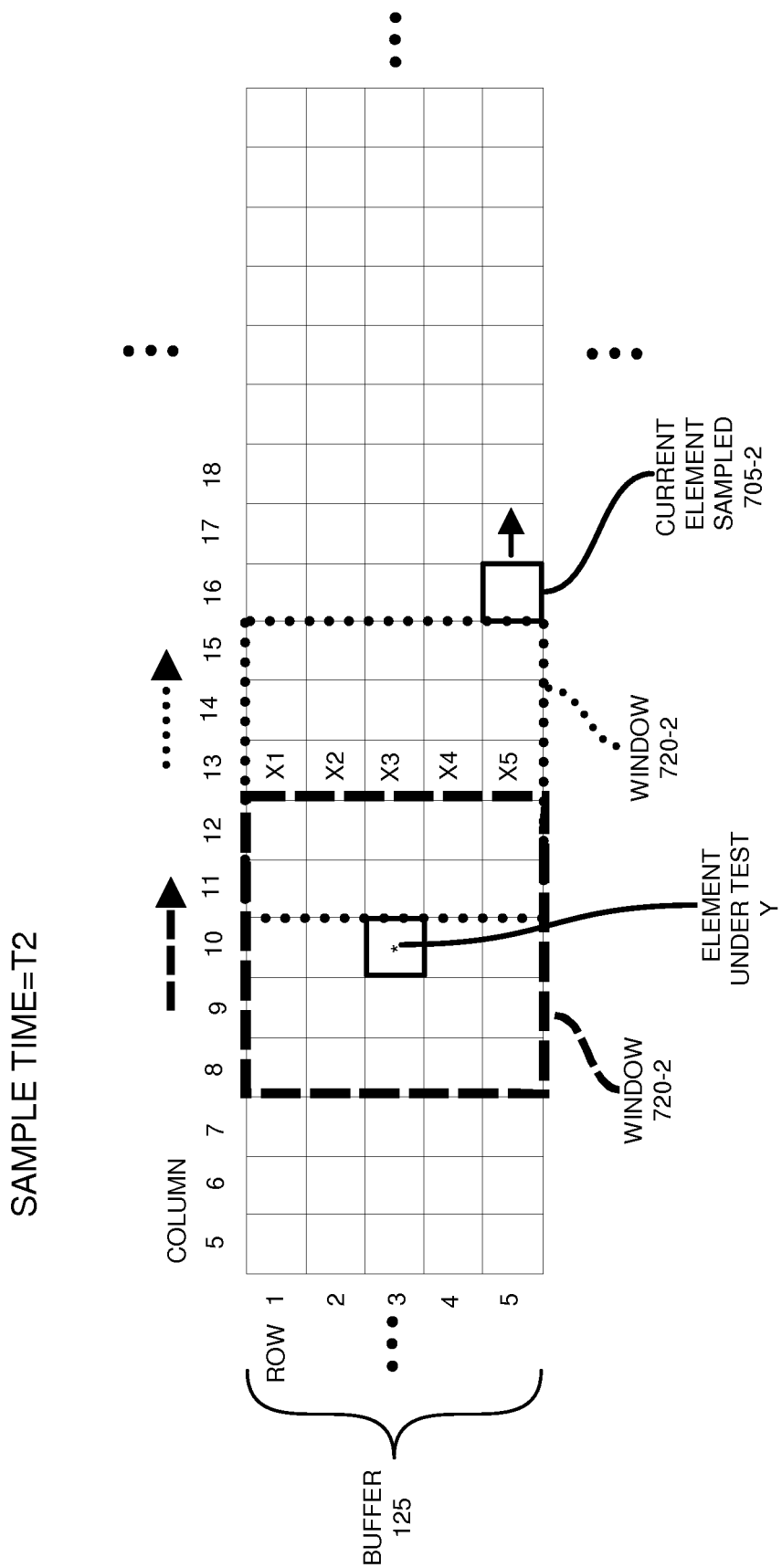
FIG. 8 is an example diagram illustrating multiple processing windows at sample window time T2 according to embodiments herein.

FIG. 8 is an example diagram illustrating multi-stage processing according to embodiments herein.

As shown, at sample window time t2, the sampling circuit 115 samples the sensor element of image sensor 103 at row 5 column 16. Also, during sample window time t2, the first stage image processor 610-1 implements multiple processing threads 620 to analyze settings for the sensor elements in window 710-2 and selectively produce substitute values 625 if it is determined that a respective intensity value recorded for the sensor element under test is defective.

More specifically, for time t2, and depending on a filter color of the X1 element under test, the X1-value generator 620-1 selectively applies the pattern 910-1 (in FIG. 9) or pattern 1010-1 (in FIG. 10) to window 710-2 of settings (i.e., intensity values) to analyze an original intensity value produced for the sensor element at row 1 column 13. In a manner as previously discussed, using the error detection and correction algorithm, the X1-value generator 620-1 determines whether the intensity value stored in buffer at row 1 column 13 needs to be corrected. If so, the X1-value generator 620-1 produces and stores a respective substitute value for the element under test in buffer 625 or buffer 125.

For time t2, and depending on a filter color of the X2 element under test, the X2-value generator 620-2 selectively applies the pattern 910-2 (in FIG. 9) or pattern 1010-2 (in FIG. 10) to window 710-2 of settings to analyze an original intensity value produced for the sensor element at row 2 column 13. In a manner as previously discussed, using the error detection and correction algorithm, the X2-value generator 620-2 determines whether the intensity value stored in buffer at row 2, column 13 needs to be corrected. If so, the X2-value generator 620-2 produces and stores a respective substitute value for the element under test in buffer 625 or buffer 125.

For time t2, and depending on a filter color of the X3 element under test, the X3-value generator 620-3 selectively applies the pattern 910-3 (in FIG. 9) or pattern 1010-3 (in FIG. 10) to window 710-2 of settings to analyze an original intensity value produced for the sensor element at row 3 column 13. In a manner as previously discussed, using the error detection and correction algorithm, the X3-value generator 620-3 determines whether the intensity value stored in buffer at row 3, column 13 needs to be corrected. If so, the X3-value generator 620-3 produces and stores a respective substitute value for the element under test in buffer 625.

For time t2, and depending on a filter color of the X4 element under test, the X4-value generator 620-4 selectively applies the pattern 910-4 (in FIG. 9) or pattern 1010-4 (in FIG. 10) to window 710-2 of settings to analyze an original intensity value produced for the sensor element at row 4 column 13. In a manner as previously discussed, and using the error detection and correction algorithm, the X4-value generator 620-4 determines whether the intensity value stored in buffer at row 4, column 13 needs to be corrected. If so, the X4-value generator 620-4 produces and stores a respective substitute value for the element under test in buffer 625 or buffer 125.

For time t2, and depending on a filter color of the X5 element under test, the X5-value generator 620-5 selectively applies the pattern 910-5 (in FIG. 9) or pattern 1010-5 (in FIG. 10) to window 710-1 of settings to analyze an original intensity value produced for the sensor element at row 5 column 13. In a manner as previously discussed, and using the error detection and correction algorithm, the X5-value generator 620-5 determines whether the intensity value stored in buffer at row 5, column 13 needs to be corrected. If so, the X5-value generator 620-5 produces and stores a respective substitute value for the element under test in buffer 625 or buffer 125.

Second stage image processor 610-2 processes settings (corrected and/or original settings) of values in window 720-2. As previously discussed, in one embodiment, the second stage image processor 610-2 implements a debayering algorithm to produce a setting for element under test Y (e.g., row 3 column 10). Second stage image processor 610-2 has access to buffer 125 that stores the original intensity values produced by the sensor elements as well as the substitute values (if any) in buffer 625 as produced by the first stage image processor 610-1. The setting of element Y as produced by the second stage image processor 610-2 depends on magnitudes of the original settings and/or corrected settings in a manner as previously discussed.

Second stage image processor 610-2 stores the value produced for element under test Y at row 3, column 10 for time window t2 in repository 680.

In this manner, in each sample time window, the image processing system 600 is able to simultaneously sample a current sensor element via a sampling circuit 110 and analog to digital circuit 115, detect and correct any defective sensor elements in a first window 710-1, and produce a final setting for the element under test Y in the second window 720-2.

Thus, the first stage image processor 610-1 can generate and store a respective substitute value produced for each of multiple sensor elements tested. Subsequent to analyzing intensity values produced by neighboring sensor elements with respect to the sensor elements under test, the second stage image processor 610-2 applies the debayering algorithm to produce a single element setting (for element under test Y) based on a window of values including: i) original intensity values produced by the neighboring sensor elements, and ii) a substitute value produced for any defective sensor elements.

Figure 11:
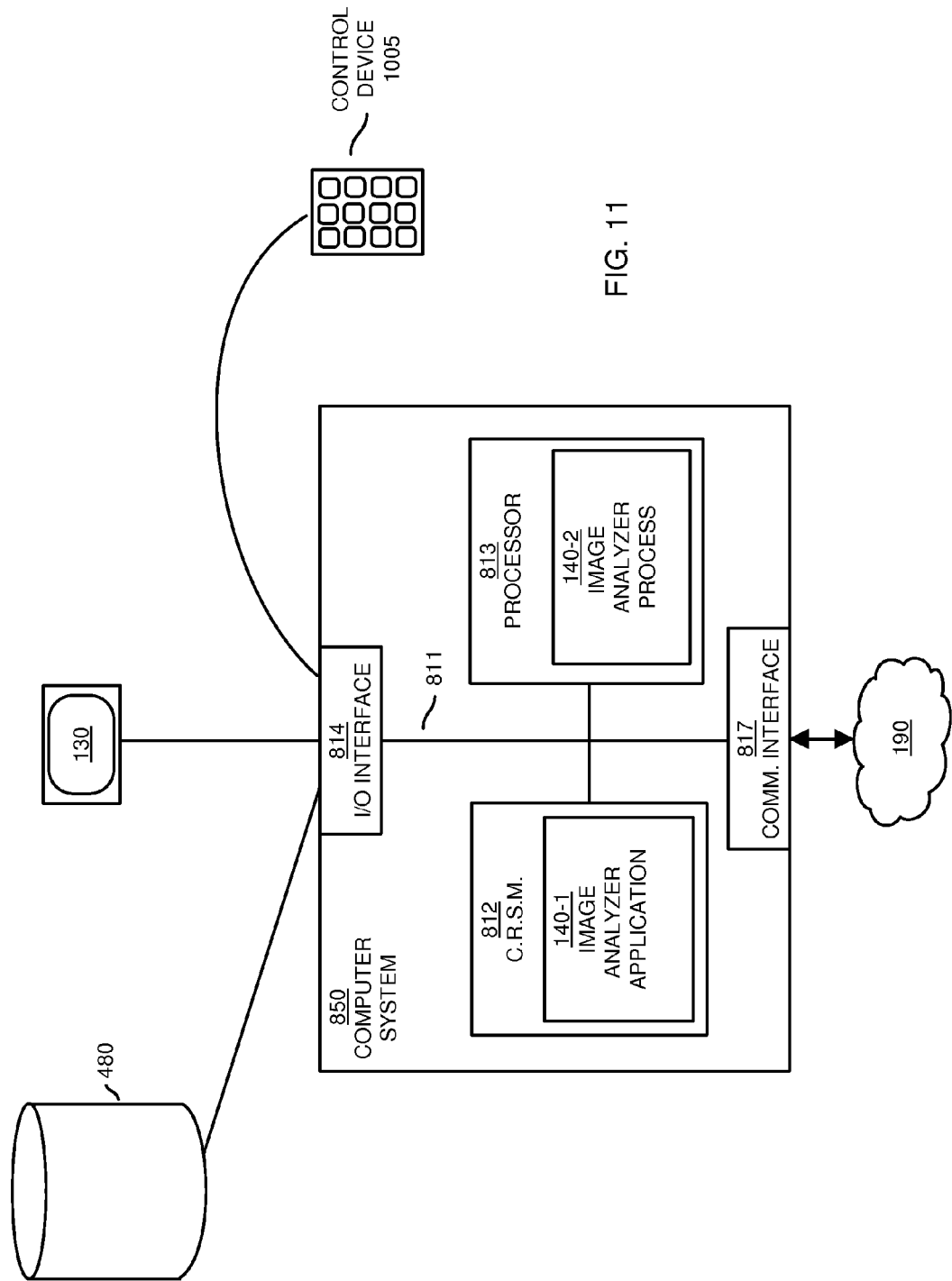
FIG. 11 is a diagram illustrating an example computer architecture in which to execute one or more embodiments as discussed herein.

FIG. 11 is an example block diagram of a computer system for implementing any of the operations as discussed herein according to embodiments herein.

As shown, computer system 850 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 480 and, if present, other devices such as a playback device 130, keypad, control device 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 850 and processor 813 to communicate over a resource such as network 190 to retrieve information from remote sources and communicate with other computers. I/O interface 814 enables processor 813 to retrieve stored information from repository 480.

As shown, computer readable storage media 812 is encoded with image analyzer application 140-1 (e.g., software, firmware, etc.) executed by processor 813. Image analyzer application 140-1 can be configured to include instructions to implement any of the operations as discussed herein. In one embodiment, the image analyzer application 140-1 is configured to perform any of the operations associated with the image-processing resource 100, image processing system 600, etc.

During operation of one embodiment, processor 813 accesses computer readable storage media 812 via the use of interconnect 811 in order to launch, run, execute, interpret or otherwise perform the instructions in image analyzer application 140-1 stored on computer readable storage medium 812.

Execution of the image analyzer application 140-1 produces processing functionality such as image analyzer process 140-2 in processor 813. In other words, the image analyzer process 140-2 associated with processor 813 represents one or more aspects of executing image analyzer application 140-1 within or upon the processor 813 in the computer system 850.

Those skilled in the art will understand that the computer system 850 can include other processes and/or software and hardware components, such as an operating system that controls allocation and use of hardware resources to execute image analyzer application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 12-13. Note that the steps in the flowcharts below can be executed in any suitable order.

Figure 12:
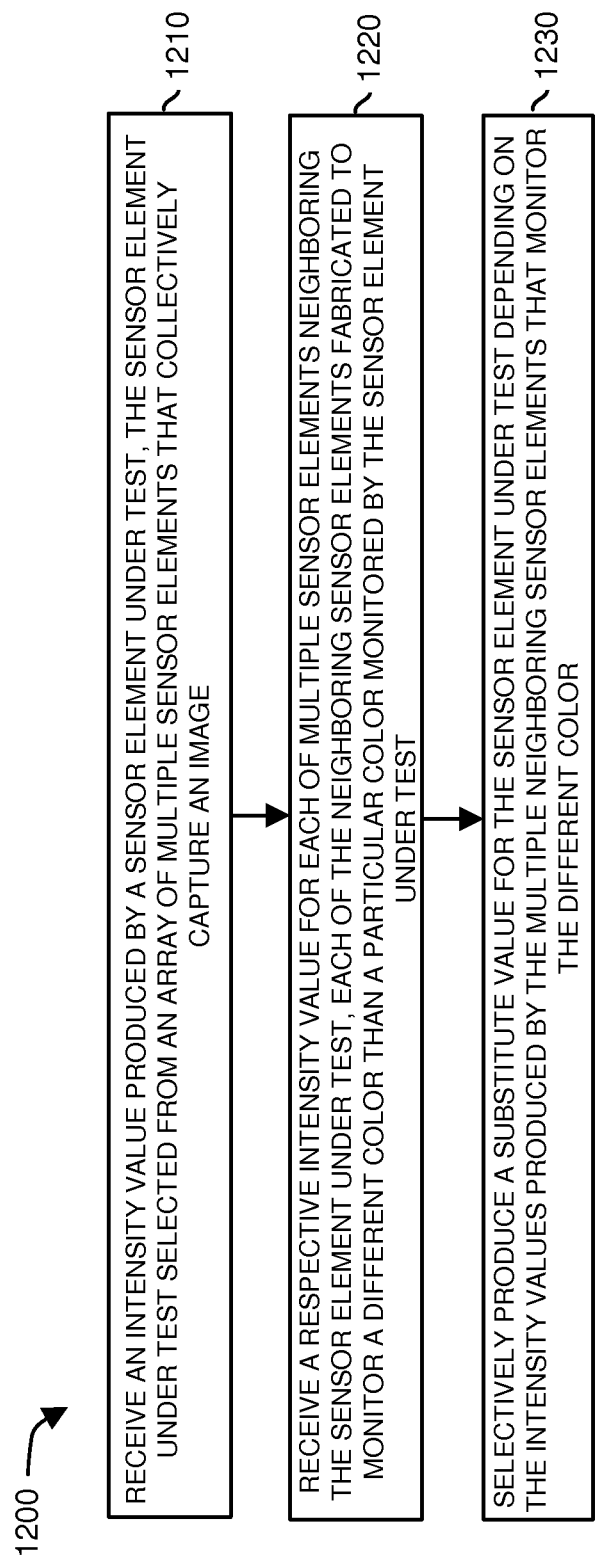
FIGS. 12 and 13 are example diagrams illustrating a method according to embodiments herein.

FIG. 12 is a flowchart 1200 illustrating an example method according to embodiments. Note that there will be some overlap with respect to concepts as discussed above.

In processing block 1210, the image processing resource 100 receives an intensity value produced by a sensor element under test X in the image sensor 103. The sensor element under test X is selected from an array of multiple sensor elements that collectively capture an image.

In processing block 1220, the image-processing resource 100 receives a respective intensity value for each of multiple sensor elements neighboring the sensor element under test X. In one embodiment, each of the neighboring sensor elements is fabricated to monitor a different color than a particular color monitored by the sensor element under test.

In processing block 1230, the image-processing resource 100 selectively produces a substitute value for the sensor element under test X depending on the intensity values produced by the multiple neighboring sensor elements that monitor the different color.

Figure 13:
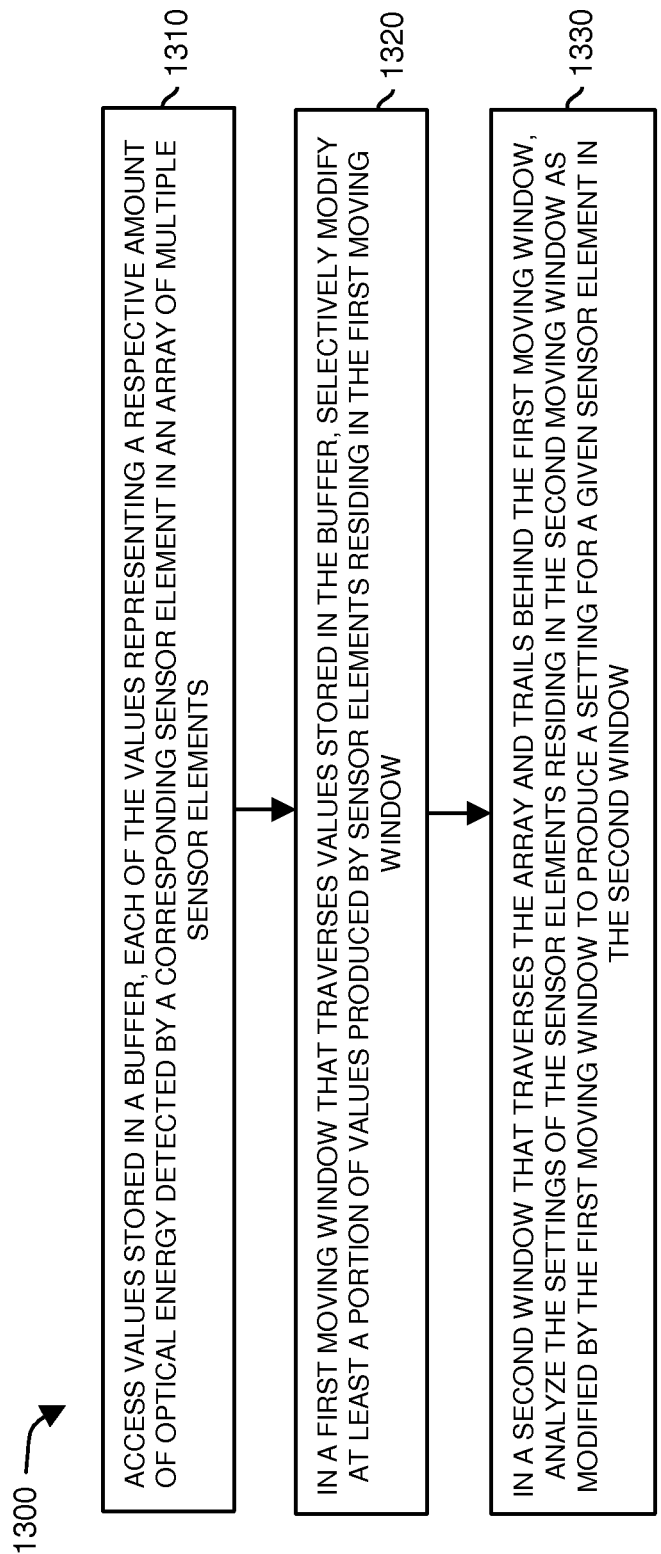

FIG. 13 is a flowchart 1300 illustrating an example method according to embodiments. Note that there will be some overlap with respect to concepts as discussed above.

In processing block 1310, the first stage image processor 610-1 accesses values stored in buffer 125. Each of the values represents a respective amount of optical energy detected by a corresponding sensor element in an array of multiple sensor elements (e.g., image sensor 103).

In processing block 1320, in a first moving window 710-1 that traverses values stored in the buffer 125, the first stage image processor 610-1 selectively modifies at least a portion of values produced by sensor elements residing in the first moving window 710-1.

In processing block 1330, in a second window 710-2 that traverses the array (of buffer values) and trails behind the first moving window 710-1, the second stage image processor 610-2 analyzes the settings of the sensor elements residing in the second moving window 710-2 as modified by the first moving window 710-1 to produce a setting for a given sensor element Y in the second window.

Note again that techniques herein are well suited for processing and enhancing captured images. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving an intensity value produced by a sensor element under test, the sensor element under test selected from an array of multiple sensor elements that collectively capture an image;
   receiving a respective intensity value for each of multiple sensor elements neighboring the sensor element under test, each of the neighboring sensor elements fabricated to monitor a different color than a particular color monitored by the sensor element under test;
   producing a substitute value for the sensor element under test, the substitute value produced depending on the intensity values produced by the multiple neighboring sensor elements that monitor the different color;
   the method further comprising:
   identifying a portion of the neighboring sensor elements that monitor a first different color than the particular color monitored by the sensor element under test;
   based on a set of intensity values produced by the portion of neighboring sensor elements that monitor the first different color, producing a range value in which the set of intensity values reside;
   scaling the range value; and
   producing the substitute value for the sensor element under test in response to detecting that the intensity value produced by the sensor element under test falls outside the scaled range.

2. The method as in claim 1, wherein producing the substitute value includes:
   in response to detecting that the intensity value produced by the sensor element under test is likely not representative of an actual optical energy of the particular color inputted to the sensor element under test, producing the substitute value for the sensor element under test based at least in part on intensity values produced by an additional set of neighboring sensor elements with respect to the sensor element under test, the additional set of neighboring sensor elements fabricated to also monitor the particular color.

3. The method as in claim 2 further comprising:
   producing the substitute value for the sensor element under test to reside within a range derived from the intensity values produced by the additional set of neighboring sensor elements.

4. The method as in claim 1, wherein the particular color monitored by the sensor element under test falls within a first wavelength range in an optical spectrum; and
   wherein the different color monitored by the neighboring sensor elements falls within a second wavelength range in the optical spectrum, the second wavelength range substantially non-overlapping with the first wavelength range.

5. The method as in claim 1 further comprising:
   producing the substitute value for the sensor element under test based at least in part on magnitudes of intensity values generated by an additional set of neighboring sensor elements with respect to the sensor element under test, the additional set of neighboring sensor elements fabricated to also monitor the particular color monitored by the sensor element under test.

6. The method as in claim 1, wherein the neighboring sensor elements are fabricated to monitor multiple different colors than the particular color monitored by the sensor element under test, a first portion of the neighboring sensor elements fabricated to monitor a first different color than the particular color, a second portion of the neighboring sensor elements fabricated to monitor a second different color than the particular color.

7. The method as in claim 6 further comprising:
   producing a first range that includes intensity values produced by the first portion of neighboring sensor elements that monitor the first different color; and
   producing a second range that includes intensity values produced by the second portion of neighboring sensor elements that monitor the second different color.

8. The method as in claim 7 further comprising:
   producing a range to test the sensor element under test;
   enlarging the range for the sensor element under test based at least in part on the first range or the second range; and
   producing the substitute value in response to detecting that the intensity value produced by the sensor element under test falls outside of the enlarged range.

9. The method as in claim 1 further comprising:
   scaling a range of intensity values for at least one different color with respect to a range of intensity values for the particular color; and
   producing the substitute value for the sensor element under test in response to detecting that the intensity value produced by the sensor element under test falls outside of the scaled range.

10. The method as in claim 1 further comprising:
    producing a threshold range based on intensity values outputted from a first set of neighboring sensor elements that monitor the different color and a second set of neighboring sensor elements that monitor the particular color;

comparing the intensity value produced by the sensor element under test to the threshold range; and in response to detecting that the intensity value produced by the sensor element under test falls outside the threshold range, producing the substitute value for the sensor element under test based at least in part on intensity values generated by an additional set of neighboring sensor elements with respect to the sensor element under test, the additional set of neighboring sensor elements fabricated to also monitor the particular color.

11. The method as in claim 2 further comprising:

storing the substitute value produced for the sensor element under test; and subsequent to verifying intensity values produced by neighboring sensor elements with respect to the sensor element under test, applying a debayering algorithm to produce a single element setting based on a window of values including: i) intensity values produced by the neighboring sensor elements, and ii) the substitute value produced for the sensor element under test.

12. A method comprising:

receiving an intensity value produced by a sensor element under test, the sensor element under test selected from an array of multiple sensor elements that collectively capture an image;

receiving a respective intensity value for each of multiple sensor elements neighboring the sensor element under test, each of the neighboring sensor elements fabricated to monitor a different color than a particular color monitored by the sensor element under test;

producing a substitute value for the sensor element under test, the substitute value produced depending on the intensity values produced by the multiple neighboring sensor elements that monitor the different color;

producing a first range, the first range defined by a range of values produced by neighboring sensor elements that monitor the particular color;

producing a second range, the second range defined by a range of values produced by neighboring sensor elements that monitor the different color;

deriving a threshold range based at least in part on the second range; and comparing the intensity value produced by the sensor element under test to the derived threshold range to determine whether to produce the substitute value for the sensor element under test.

13. The method as in claim 12, wherein deriving the threshold range includes:

producing a first average value, the first average value derived from the values produced by the neighboring sensor elements that monitor the particular color;

producing a second average value, the second average value derived from the values produced by the neighboring sensor elements that monitor the different color;

producing a gain value, the gain value substantially equal to the second average value divided by the first average value;

multiplying the second range by the gain value to produce a new range;

in response to detecting that the new range is larger than the first range, scaling the new range value with respect to the first average value to produce the threshold range.

14. A computer system comprising:

a processor device; and a hardware storage resource coupled to the processor, the hardware storage resource storing instructions that, when executed by the processor device, cause the processor device to perform operations of:

receiving an intensity value produced by a sensor element under test, the sensor element under test selected from an array of multiple sensor elements that collectively capture an image;

receiving a respective intensity value for each of multiple sensor elements neighboring the sensor element under test, each of the neighboring sensor elements fabricated to monitor a different color than a particular color monitored by the sensor element under test;

producing a substitute value for the sensor element under test, the substitute value produced depending on the intensity values produced by the multiple neighboring sensor elements that monitor the different color;

identifying a portion of the neighboring sensor elements that monitor a first different color than the particular color monitored by the sensor element under test;

based on a set of intensity values produced by the portion of neighboring sensor elements that monitor the first different color, producing a range value in which the set of intensity values reside;

scaling the range value; and producing the substitute value for the sensor element under test in response to detecting that the intensity value produced by the sensor element under test falls outside the scaled range.

15. The computer system as in claim 14, wherein producing the substitute value includes:

in response to detecting that the intensity value produced by the sensor element under test is likely not representative of an actual optical energy of the particular color inputted to the sensor element under test, producing the substitute value for the sensor element under test based at least in part on intensity values produced by an additional set of neighboring sensor elements with respect to the sensor element under test, the additional set of neighboring sensor elements fabricated to also monitor the particular color.

16. The computer system as in claim 15, wherein the processor device further performs operations of:

producing the substitute value for the sensor element under test to reside within a range derived from the intensity values produced by the additional set of neighboring sensor elements.

17. The computer system as in claim 14, wherein the particular color monitored by the sensor element under test falls within a first wavelength range in an optical spectrum; and wherein the different color monitored by the neighboring sensor elements falls within a second wavelength range in the optical spectrum, the second wavelength range substantially non-overlapping with the first wavelength range.

18. The computer system as in claim 14, wherein the processor device further performs operations of:

producing the substitute value for the sensor element under test based at least in part on magnitudes of intensity values generated by an additional set of neighboring sensor elements with respect to the sensor element under test, the additional set of neighboring sensor elements fabricated to also monitor the particular color monitored by the sensor element under test.

19. The computer system as in claim 14, wherein the neighboring sensor elements are fabricated to monitor multiple different colors than the particular color monitored by the sensor element under test, a first portion of the neighboring sensor elements fabricated to monitor a first different color than the particular color, a second portion of the neighboring sensor elements fabricated to monitor a second different color than the particular color.

20. The computer system as in claim 19, wherein the processor device further performs operations of:
producing a first range that includes intensity values produced by the first portion of neighboring sensor elements that monitor the first different color; and
producing a second range that includes intensity values produced by the second portion of neighboring sensor elements that monitor the second different color.

21. The computer system as in claim 20, wherein the processor device further performs operations of:
producing a range to test the sensor element under test;
enlarging the range for the sensor element under test based at least in part on the first range or the second range; and
producing the substitute value in response to detecting that the intensity value produced by the sensor element under test falls outside of the enlarged range.

22. The computer system as in claim 21, wherein the processor device further performs operations of:
scaling a range of intensity values for at least one different color with respect to a range of intensity values for the particular color; and
producing the substitute value for the sensor element under test in response to detecting that the intensity value produced by the sensor element under test falls outside of the scaled range.

23. The computer system as in claim 14, wherein the processor device further performs operations of:
producing a threshold range based on intensity values outputted from a first set of neighboring sensor elements that monitor the different color and a second set of neighboring sensor elements that monitor the particular color;
comparing the intensity value produced by the sensor element under test to the threshold range; and
in response to detecting that the intensity value produced by the sensor element under test falls outside the threshold range, producing the substitute value for the sensor element under test based at least in part on intensity values generated by an additional set of neighboring sensor elements with respect to the sensor element under test, the additional set of neighboring sensor elements fabricated to also monitor the particular color.

24. The computer system as in claim 14, wherein the processor device further performs operations of:
producing a first range, the first range defined by a range of values produced by neighboring sensor elements that monitor the particular color;
producing a second range, the second range defined by a range of values produced by neighboring sensor elements that monitor the different color;
deriving a threshold range based at least in part on the second range; and
comparing the intensity value produced by the sensor element under test to the derived threshold range to determine whether to produce the substitute value for the sensor element under test.

25. The computer system as in claim 24, wherein deriving the threshold range includes:
producing a first average value, the first average value derived from the values produced by the neighboring sensor elements that monitor the particular color;
producing a second average value, the second average value derived from the values produced by the neighboring sensor elements that monitor the different color;
producing a gain value, the gain value substantially equal to the second average value divided by the first average value;
multiplying the second range by the gain value to produce a new range;
in response to detecting that the new range is larger than the first range, scaling the new range value with respect to the first average value to produce the threshold range.

26. The computer system as in claim 15, wherein the processor device further performs operations of:
storing the substitute value produced for the sensor element under test; and
subsequent to verifying intensity values produced by neighboring sensor elements with respect to the sensor element under test, applying a debayering algorithm to produce a single element setting based on a window of values including: i) intensity values produced by the neighboring sensor elements, and ii) the substitute value produced for the sensor element under test.

27. Computer-readable storage hardware having instructions stored thereon, the instructions, when carried out by at least one processing device, causes the at least one processing device to perform operations of:
receiving an intensity value produced by a sensor element under test, the sensor element under test selected from an array of multiple sensor elements that collectively capture an image;
receiving a respective intensity value for each of multiple sensor elements neighboring the sensor element under test, each of the neighboring sensor elements fabricated to monitor a different color than a particular color monitored by the sensor element under test; and
producing a substitute value for the sensor element under test, the substitute value produced depending on the intensity values produced by the multiple neighboring sensor elements that monitor the different color;
the at least one processing device further performing operations of:
producing a first range, the first range defined by a range of values produced by neighboring sensor elements that monitor the particular color;
producing a second range, the second range defined by a range of values produced by neighboring sensor elements that monitor the different color;
deriving a threshold range based at least in part on the second range; and
comparing the intensity value produced by the sensor element under test to the derived threshold range to determine whether to produce the substitute value for the sensor element under test.

* * * * *